United States Patent [19]

Löhr et al.

[11] Patent Number: 4,584,343

[45] Date of Patent: Apr. 22, 1986

[54] CROSSLINKABLE FLUORINE-CONTAINING COPOLYMERS, SURFACE-COATINGS BASED ON THESE COPOLYMERS, AND THE USE THEREOF

[75] Inventors: Gernot Löhr, Burgkirchen; Josef Mondt, Königstein; Hans Gräff, Schlangenbad, all of Fed. Rep. of Germany

[73] Assignee: Hoechst Aktiengesellschaft, Fed. Rep. of Germany

[21] Appl. No.: 686,727

[22] Filed: Dec. 27, 1984

[30] Foreign Application Priority Data

Dec. 31, 1983 [DE] Fed. Rep. of Germany ....... 3347655

[51] Int. Cl.[4] .................. C08F 214/18; C08F 214/26; C08F 218/10
[52] U.S. Cl. ...................................... 525/60; 428/522
[58] Field of Search .......................................... 525/60

[56] References Cited

U.S. PATENT DOCUMENTS

3,100,199  8/1963  Fordham et al. ...................... 525/60
3,651,003  3/1972  Bechtold ............................... 525/60

Primary Examiner—Harry Wong, Jr.
Attorney, Agent, or Firm—Connolly and Hutz

[57] ABSTRACT

Crosslinkable fluorine-containing copolymers comprising copolymerized units of
  (a) a vinyl ester of a heavily branched carboxylic acid,
  (b) a vinyl ester of a short-chain carboxylic acid and
  (c) of a fluoroolefin, the vinyl ester groups of component (b) having been converted into OH groups by solvolysis of the copolymer. The copolymers are suitable for coating purposes of any type, in particular as binders in surface-coating systems for industrial surface-coatings.

4 Claims, No Drawings

CROSSLINKABLE FLUORINE-CONTAINING COPOLYMERS, SURFACE-COATINGS BASED ON THESE COPOLYMERS, AND THE USE THEREOF

A large number of coating systems based on fluoropolymers are known. Such coatings are applied in most cases from dispersions in liquid dispersing media, the particle size being within the range from relatively coarse down to colloidal particle sizes, the liquid medium being water or an organic solvent or a mixture of the two. Since the common fluoropolymers are in most cases sparingly soluble or even insoluble in organic solvents, coatings from solutions, in particular from those organic solvents which are usual in the surface-coatings industry, for example ethylene glycol esters, methyl isobutyl ketone, toluene, xylene and the like, are encountered relatively infrequently.

Coating systems of this type are represented by fluorine-containing copolymers, such as are known, for example, from German Offenlegungsschrift No. 2,804,262 and British Pat. No. 2,081,727. The quaterpolymers, described in the last-mentioned printed publication, composed of fluoroolefins, cyclohexyl vinyl ethers, alkyl vinyl ethers and hydroxyalkyl vinyl ethers give surface-coating systems which, with the use of isocyanates, can be cured even at room temperature. With respect to their gloss, their flow properties and their weathering resistance, however, these surface-coatings are not yet satisfactory and require improvement.

To eliminate these disadvantages, the present invention provides a crosslinkable fluorine-containing copolymer comprising (a) 20 to 80 mol % of copolymerized units of a vinyl ester of the formula

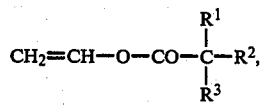

in which
R$^1$, R$^2$ and R$^3$ are branched or straight-chain alkyl radicals and at most one of these radicals is hydrogen, the total acyl radical of the vinyl ester having at least 9 and at most 28 carbon atoms, (b) 5 to 50 mol % of copolymerized units of a vinyl ester of the formula

in which
R$^4$ is a straight-chain alkyl radical having 1 to 3 carbon atoms, 90 to 100% of the copolymerized units of this vinyl ester of component (b) being present in the OH form obtained by solvolysis, and (c) copolymerized units of a fluoroolefin in a quantity which makes the sum of the components a+b+c up to 100, but with the proviso that at least 10 mol % of copolymerized units of this fluoroolefin are present in the copolymer.

Preferably, this copolymer comprises
(a) 20 to 60 mol % of copolymerized units of a vinyl ester of component (a) defined above,
(b) 5 to 30 mol % of copolymerized units of a vinyl ester of component (b) defined above, 90 to 100% of the total number of copolymerized units of this vinyl ester being present in the OH form obtained by solvolysis, and
(c) copolymerized units of a fluoroolefin in a quantity which makes the sum of the components a+b+c up to 100, but with the proviso that at least 25 mol % of copolymerized units of this fluoroolefin are present in the copolymer.

The provision of these copolymers according to the invention is based on the inventive concept of preparing a copolymer which is readily soluble in conventional surface-coating solvents and which, moreover, is crosslinkable at room temperature, and this is achieved by means of a copolymer which comprises a fluoroolefin and, on the one hand, a virtually non-saponifiable vinyl ester and, on the other hand, a vinyl ester which virtually is large or completely saponifiable or saponified.

Particularly preferred components (a) in the copolymers according to the invention are vinyl esters having branched acyl radicals

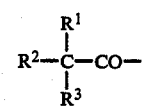

which have a total of 9 to 11 carbon atoms and in which at most one of these radicals is hydrogen.

The branched carboxylic acids, on which these acyl radicals are based, are accessible by the Koch synthesis from monoolefins, carbon monoxide and water. The said carboxylic acids are known to those skilled in the art under the names VERSATIC ® acids or NEO ® acids The corresponding vinyl esters can be obtained from such branched carboxylic acids by transvinylation with vinyl acetate. However, they are also obtainable by the Reppe synthesis by means of adding acetylene to the corresponding carboxylic acids.

Vinyl esters suitable for component (b) of the copolymer are those of the formula

in which
R$^4$ is a methyl, ethyl or propyl radical. Vinyl acetate is preferred.

The fluoroolefin used as component (c) can be selected as desired from this group of fluoroolefins, including mixtures of different fluoroolefins. The term fluoroolefin includes perfluoroolefins.

This is to be understood as a hydrocarbon which has a double bond—which is preferably terminal—and the H atoms of which, starting from at least one up to the total number, are substituted by F and the remaining H atoms of which can be partially or completely replaced by Cl.

Preferably, fluoroolefins of the formula CF$_2$=CXY are selected as the comonomers, in which X and Y can be identical or different and are H, F or Cl. Examples of such comonomers are thus vinylidene fluoride, trifluoroethylene, chlorotrifluoroethylene and especially tetrafluoroethylene, or also mixtures of such comonomers.

If appropriate, a small part of the molar quantity of the abovementioned fluoroolefin of the formula CF$_2$CXY, namely 0 to 20% of this molar quantity, can be replaced by one or more of the fluoroolefins of the formula CF$_2$=CF—Z, in which Z is a perfluoroalkyl radical or a fluoroalkyl radical having 1 to 8 carbon atoms or a radical —O—R$^5$, in which R$^5$ is a perfluoroalkyl radical, a perfluoro-(alkoxyalkyl) radical, an alkyl radical or a cycloalkyl radical each having 1 to 10 carbon atoms. Examples which may be mentioned here are hexafluoropropene and the higher homologous perfluoro-1-alkenes which can also be branched, and the partially hydrogen-substituted homologs of these higher perfluoroolefins, and also perfluoro-(alkyl vinyl ethers), preferably perfluoro-(propyl vinyl ether), perfluoro-(alkoxyalkyl vinyl ethers) such as perfluoro-(propoxypropyl vinyl ether), and alkyl or cycloalkyl perfluorovinyl ethers such as, for example, ethyl or cyclohexyl perfluorovinyl ether.

Preferably, however, exclusively chlorotrifluoroethylene or, in particular, tetrafluoroethylene should be employed as the comonomer of component (c).

The copolymers according to the invention are prepared in such a way that initially the branched-chain vinyl ester of component (a), the vinyl ester of component (b) and the fluoroolefin of component (c) are subjected to copolymerization and subsequently component (b) of the copolymer is converted to the OH form to the extent of more than 90%, preferably virtually completely, by means of solvolysis, in particular with lower alcohols or with water.

The polymerization is preferably carried out by the emulsion polymerization process to give colloidal dispersions. For this purpose, emulsifiers in a quantity of 0.01 to 2% by weight, preferably 0.05 to 0.5% by weight, relative to the quantity by weight of the aqueous polymerization medium introduced, must be added to the liquor. In principle, all the non-ionic and anionic emulsifiers can be used, with which those skilled in the art are familiar and which are suitable for the emulsion polymerization of fluoroolefins. Emulsifiers of this type are the ammonium and alkali metal salts of ω-hydrofluorocarboxylic acids, of perfluoroalkoxypropionic acids, in particular of perfluoropropoxypropionic acid, of perfluoroalkylsulfonic acids and perfluoroalkylphosphonic acids and, preferably, of perfluorocarboxylic acids having relatively long perfluoroalkyl chains, in particular those having 6 to 12 carbon atoms in the perfluoroalkyl radical. The abovementioned emulsifiers can also be employed in the form of their free acids and, if appropriate, can be neutralized with ammonia, and the pH value can be adjusted at the same time via the acid/ammonia ratio. If appropriate, non-fluorinated emulsifiers can also be used.

If appropriate, buffer substances such as, for example, the alkali metal and ammonium salts of oxalic acid, of the phosphoric acids or of acetic acid can also be used in the copolymerization. If premature solvolysis of the vinyl ester of component (b) is to be avoided, it is advantageous to carry out the copolymerization at pH values in the acidic range or in the at most weakly alkaline range, that is to say approximately at pH values from 3 to 8.

The copolymerization of the said comonomers is initiated in the presence of catalysts which form free radicals. For the formation of free radicals, either a hard, high-energy radiation or water-soluble catalysts which form free radicals, such as are known to those skilled in the art in a large number for the copolymerization of fluoroolefins, can be used. Such catalysts are in particular peroxidic compounds. By way of example only, hydrogen peroxide, acyl peroxides such as, for example, diacetyl peroxide, dipropionyl peroxide, dibutyryl peroxide, dibenzoyl peroxide, benzoyl acetyl peroxide, dilauroyl peroxide, disuccinic acid peroxide or diglutaric acid peroxide, may be mentioned here. In addition, water-soluble peracids, such as peracetic acid and its water-soluble salts (in particular the ammonium, sodium or potassium salts) or its esters such as, for example, tert.-butyl peroxyacetate and tert.-butyl peroxypivalate, should be mentioned. The water-soluble salts, in particular the ammonium, potassium and sodium salts, of other peracids, such as peroxomono- and peroxodi-sulfates, perphosphates, perborates or percarbonates can also be used. Moreover, perfluoroacyl peroxides or ω-hydrofluoroacyl peroxides are suitable. A further class of applicable catalysts is represented by certain water-soluble azo compounds, such as are described, for example, in U.S. Pat. Nos. 2,471,959, 2,515,628 and 2,520,338. Above all in the low temperature region, the catalysts used can also be the known active redox systems which generate free radicals to an adequate extent even at temperatures between 10° and 50° C.; from amongst the redox systems, with which those skilled in the art are familiar, for the polymerization of fluoroolefins, the combinations of water-soluble peroxidic compounds, preferably peroxodisulfates, with hydrogen sulfite or disulfite, or their addition products with formaldehyde (Rŏngalit ®), with thiosulfate or with diimine-releasing compounds (U.S. Pat. No. 4,112,211), for example with hydrazine or azodicarboxamide, may be mentioned here, by way of example only. In these redox combinations also, the salts of the said compounds, preferably the alkali metal salts and in particular the ammonium salts, are present.

The total quantity of catalyst can here be added at the start of the reaction of the polymerization liquor. In the case of relatively large batches, however, it can be advantageous to introduce the entire quantity of the catalyst continuously during the course of the polymerization. Likewise, a part of the catalyst quantity can also be added at the beginning and the remainder can be introduced later, all at once or in partial quantities. The addition of co-activators, that is to say, for example, soluble salts of iron and silver, can be advantageous, in particular when redox systems are used as the catalysts.

The copolymers according to the invention can also be prepared by the suspension polymerization process. For this purpose, the pH is adjusted to the required weakly acidic or weakly alkaline range by the addition of suitable buffer substances which, in most cases, also act as precipitants at the same time, for example ammonium chloride, ammonium dihydrogen phosphate, boric acid, ammonium oxalate, borax, ammonium carbonate, ammonium bicarbonate, ammonium carbamate or ammonium pentaborate, or mixtures of such compounds. It can be advantageous also in the suspension polymerization to add a relatively small quantity of the abovementioned emulsifiers in order to avoid the formation of lumps and scaling of the vessel and to obtain a more uniform particle size of the copolymer. The quantity by weight of such emulsifiers is here in general below 150 ppm, preferably below 50 ppm, relative to the quantity by weight of the aqueous liquor introduced at the start of the polymerization.

The copolymerization can also be carried out in organic solvents which have at most a very slight telogenic activity and preferably do not dissolve the copolymer formed. Solvents suitable for this purpose are in particular perfluorinated solvents, or solvents which are perhalogenated with fluorine and chlorine, such as especially 1,1,2-trichlorotrifluoroethane or perfluorocyclobutane. In each case, those which are sufficiently soluble in the particular solvent must then be selected from the abovementioned catalysts. An addition of proportions of such solvents is also possible in the above-described processes of suspension polymerization or emulsion polymerization in an aqueous medium.

The addition of suitable chain-transfer agents with a controlling action in the copolymerization both by the emulsion process and the suspension process, in an aqueous medium or in an organic solvent, is also of advantage. Suitable chain-transfer agents are aliphatic alcohols or ether-alcohols having a short chain, aliphatic carboxylates or ketones, dialkylglycols, mercaptans and additionally also saturated aliphatic halogenohydrocarbons which contain fluorine, chlorine and/or bromine as the halogens and, in some cases, also hydrogen. Examples of such halogenohydrocarbons which may be mentioned are tetrachloroethane, trichloroethane, tetrafluorodibromoethane and especially chloroform, methylene chloride and carbon tetrachloride. The chain-transfer agent is usually added at the start of the polymerization, but it is also possible to put a part quantity aside and to meter it in at a later stage of the process.

The copolymerization is carried out at temperatures from 0° to 100° C., preferably from 35° to 80° C., this temperature depending in detail especially on the type of the catalyst employed. In the copolymerization, the fluoroolefin is charged under pressure, and this pressure is then maintained. It can have values in the range from just above atmospheric pressure up to about 40 bar; preferably, a pressure from 5 bar to 25 bar is maintained.

Preferably, about 5 to 20% by weight of the theoretically required quantity of vinyl esters of component (a) and of component (b) are introduced into the polymerization vessel at the start of the copolymerization, and the remainder is then metered in as the copolymerization with the fluoroolefin proceeds. It is also possible, however, to introduce only a part quantity of the vinyl ester of component (a) and later to feed the remainder of its theoretically required quantity, together with the total quantity of the vinyl ester of component (b) and of fluoroolefin. Finally, the polymerization can also start with simultaneous feed of all the components (it being possible for one or more of these to be premixed) and to maintain this feed continuously during the process.

After the end of the polymerization, the polymerization liquor is worked up in the conventional manner. In the case of precipitation polymerization by the suspension process, the granular polymer is separated off by conventional separation methods, for example by filtration, screening, centrifuging and the like. In the case of emulsion polymerization, the colloidal dispersion obtained is caused to coagulate by the addition of conventional coagulants such as, for example, electrolyte salts, mineral acids or organic solvents, or by applying high shear forces, and the coagulate is separated from the aqueous liquor in the conventional manner. The moist polymer thus obtained is washed and dried at temperatures of 10° to 70° C., if appropriate while inert gas is blown through.

The copolymer thus obtained and dried is then subjected to an aftertreatment by solvolysis, in order to convert the ester groupings in the vinyl ester units from component (b) into OH groups. The aftertreatment is carried out preferably at room temperature with short-chain alkanols, with strong bases as the catalysts. During this treatment, the copolymer is dissolved in the alkanol and then precipitated with water. It is obtained as a white to pale yellow-colored powder which tends to cake at room temperature, and is then dried, preferably in a fluidized bed.

The saponification of this ester group to give the free OH form can, however, also be accomplished by any other method suitable for this purpose, for example by hydrolysis with aqueous alkalis or with quaternary ammonium hydroxides.

The copolymer thus treated then contains 90 to 100% of the previous ester groups of component (b) as OH groups; preferably, the conversion is virtually complete, that is to say the vinyl ester groups, which are still present, from component (b) are no longer analytically detectable. Depending on the quantity of the copolymerized units of component (b), originally contained therein, and depending on the degree of conversion during the solvolysis, such copolymers have an OH number from 30 to 300, preferably from 40 to 150.

The copolymers according to the invention, obtained in this way, are readily soluble in a large number of organic solvents. This applies above all to solvents and solvent mixtures, such as are conventionally used in the surface-coatings industry.

The following examples are typical of such solvents: Aliphatic alcohols having 1 to 8 carbon atoms, in particular those having 4 to 8 carbon atoms; polyglycols such as diethylene glycol, triethylene glycol, dipropylene glycol and tripropylene glycol; monoethers and diethers of such glycols, such as, for example, ethylene glycol monomethyl ether, ethylene glycol dimethyl ether, ethylene glycol monoethyl ether, ethylene glycol diethyl ether, ethylene glycol monobutyl ether and ethylene glycol dibutyl ether; glycol esters or glycol etheresters, such as, for example, ethylene glycol acetate or ethylene glycol acetate-ethyl ether; alkylated and dialkylated aromatics, such as, for example, xylene and diethylbenzene; carboxylates, in particular those of acetic and propionic acid with alcohols having 1 to 6 carbon atoms; also any mixtures of such solvents, provided they are homogeneously miscible with one another.

The copolymers according to the invention can be used directly as dispersions from an aqueous or organic phase for coating purposes, for example for coating non-wovens or fabrics.

For use as a surface-coating, however, the addition of especially a crosslinking agent or curing agent is preferred. Aminoplast resins can above all be used for this purpose. Heat-curable coatings are then obtained, which have excellent flow and give particularly elastic, strongly adhering, corrosion-resistant and weathering-resistant, in particular water-resistant primers, top coats and single-layer coatings.

Aminoplast resins are understood as heat-curable reaction products obtained from aldehydes, preferably formaldehyde, with polyfunctional amines, such as, for example, urea, melamine, benzoguanamine or other triazines. Etherified products can also be used. Baking temperatures of at least 120° C. are required for curing such surface-coatings modified with aminoplast resins. The crosslinking reaction can be accelerated by the addition of an acidic catalyst such as, for example, p-toluenesulfonic acid.

With polyisocyanates, curing can take place even at room temperature, but forcing under hot conditions at temperatures up to about 80° C. is expedient even in this case. Finally, the possibility of crosslinking with epoxide resins should also be mentioned; this is likewise carried out under hot conditions and with catalysts, in particular with lithium salts and quaternary ammonium salts.

All the pigments common in the surface-coating industry can be used for the formulation of surface-coating systems, in particular titanium dioxide, iron oxides, and also cadmium sulfide, zinc sulfide, white lead, barium sulfate, pyrogenic silica, bentonites and chalk. The pigmentation level, that is to say the binder i.e. copolymer according to the invention): pigment ratio, is within the range from 1:0.2 to 1:3.0. Such surface-coating formulations can also contain conventional additives, such as, for example, flow agents, dispersants, wetting agents, extenders of auxiliaries for improving gloss or adhesion.

For the preparation of surface-coating systems, the copolymers according to the invention, obtained in granular form in the manner described above, are dissolved in a suitable organic solvent or a solvent mixture to the highest possible concentration (>40% by weight), and the pigment or pigments and the additives which may be required are admixed to this solution and brought into homogeneous distribution.

The surface-coating systems—containing 10 to 50% by weight of the fluorinated copolymer defined above—formulated with the addition of the said crosslinking agents give coatings which can be applied to the most diverse substrates and—depending on the crosslinking component—can be cured at room temperature or baked at elevated temperatures. Coatings can be applied in particular to metals, such as, for example, iron, steel, aluminum, copper, bronze and brass, and also to other hard surfaces, such as glass, ceramics or also wood or plastic surfaces.

The application can be carried out by any conventional methods, such as spraying, knife-coating, brushing, rolling, dipping, flow-coating, roller-coating or spreading. The surface-coating systems formed on the basis of the copolymers according to the invention are particularly suitable for industrial surface-coatings, above all for the so-called coil coating process, which is a continuous process for coating metal coils at rates of nowadays up to 120 m/minute. Sheets of cold-rolled steel, galvanized steel, of aluminum and aluminum alloys are above all coated by this process; for general industrial coatings, any technical steel grades, non-ferrous metals and sheets pretreated by bonderizing are also possible.

The coatings obtained from coating agents based on the copolymers according to the invention are distinguished above all by excellent weathering resistance, such as manifests itself, for example, in the so-called sun test. This test makes it possible to obtain, within relatively short periods, information on the weathering resistance: samples are exposed to the radiation of a xenon lamp over a period of days or weeks, alternating between 3 minutes under water and then 17 minutes dry each time, and this rhythm is repeated as often as desired. Under these test conditions, a silicone-modified polyester resin, which is regarded as particularly resistant to yellowing, shows the first appearance of yellowing after 200 hours, whereas no yellowing can yet be observed even after 500 hours in the case of samples which contain the copolymers according to the invention.

Whilst it is usually difficult to obtain homogeneously distributed pigmentation in surface-coating systems and coating agents which have been formulated on the basis of fluorine-containing polymers, this is very easily accomplished, surprisingly, with the formulations prepared on the basis of the copolymers according to the invention.

The copolymers according to the invention are distinguished by high reactivity with crosslinking components of any type, and this allows rapid and complete final curing. The coatings and films produced from such surface-coating systems show good hiding power, smoothness, elasticity, adhesion, surface hardness and high gloss.

The invention is illustrated by the examples which follow:

EXAMPLE 1

25 l of deionized water containing 40 g of perfluorooctanoic acid (neutralized with $NH_3$), 100 g of Rongalit ® (addition product of formaldehyde and sodium dithionite), 20 g of ammonium carbonate and 1 g of ferrous ammonium sulfate in solution are initially introduced into a 40 liter kettle. Oxygen is removed from the vessel in the conventional manner, and the temperature of the medium which has been introduced is raised to 40° C. 300 cm$^3$ of a monomer emulsion which is composed of 500 g of vinyl acetate, 1,500 g of a vinyl ester of component (a) (the acyl radical being a mixture of substantially one acyl component with $R^1=CH_3$, $R^2=C_2H_5$, $R^3=CH_3(CH_2)_4$— and another acyl component with $R^1=CH_3$, $R^2=CH_3$, $R^3=CH_3(CH_2)_5$—), 2 l of deionized water and 1 g of perfluorooctanoic acid and which has been prepared with the aid of an Ultra-Turra ®, are then added. The polymerization is then started under a tetrafluoroethylene pressure of 10 bar by the addition of 20 g of ammonium persulfate. The remaining monomer emulsion and a further 200 g of ammonium persulfate dissolved in 2 l of deionized water are metered in continuously in the course of 4 hours and, half an hour after the addition has been completed, the polymerization is ended. This gives a stable dispersion which contains about 3.5 kg of copolymer.

This dispersion is coagulated by acidification with HCl, and the coagulate obtained is washed in deionized water and dried in a fluidized bed.

The copolymer thus dried is slurried in a 1:1 methanol/ethanol mixture, and about 1% by weight of sodium methylate, relative to the copolymer added, is added to this slurry. The alcoholysis takes place at room temperature and is complete after 1 hour, which is detectable by the fact that the product has completely gone into solution. The mixture is then neutralized with acetic acid, and the product is precipitated in water. The copolymer obtained has a white to pale yellowish color. It is dried once more in a fluidized bed at 40° C. It contains 51 mol % of tetrafluoroethylene units, 28 mol % of copolymerized units of the vinyl ester of component (a) (Versatic ® vinyl ester) and 21 mol % of copolymerized units of vinyl acetate. It has an OH number of 120. The product dissolves in glycol acetate-monoethyl ether, and a 50% by weight solution in this solvent has a viscosity of 10 Pas.

EXAMPLE 2

The copolymerization is carried out as described in Example 1, but using a monomer emulsion which contains 900 g of vinyl acetate and 1,200 g of a Versatic ® vinyl ester as defined in Example 1 in 2 l of deionized water and with the addition of 10 g of perfluorooctanoic acid.

The copolymer obtained comprises 32 mol % of copolymerized units of tetrafluoroethylene, 26 mol % of copolymerized units of the Versatic ® vinyl ester, defined above, of component (a) and 42 mol % of copolymerized units of vinyl acetate. After the alcoholysis, it has an OH number of 245. A 50% by weight solution of this copolymer in glycol acetate-ethyl ether has a viscosity of 40 Pas.

EXAMPLE 3

Copolymerization is carried out as in Example 1, with the difference that, in this case, a monomer emulsion is not initially introduced but, instead, the two comonomers of components (a) and (b) are added in a premixed form, namely in a quantity of 1,200 g of the Versatic ® vinyl ester, defined above, of component (a) and 300 g of vinyl acetate. 10% of this quantity is initially introduced, and the rest is metered in over a period of 4 hours. Tetrafluoroethylene is fed in separately, and a constant pressure of 10.5 bar is maintained. The polymerization temperature is 55° C. A quantity of 100 g of tert.-butanol as a chain-transfer agent is introduced at the beginning together with the other polymerization auxiliaries.

The copolymer obtained comprises 50.5 mol % of copolymerized units of tetrafluoroethylene, 31 mol % of copolymerized units of the Versatic ® vinyl ester, defined above, of component (a) and 18.5 mol % of copolymerized units of vinyl acetate. After alcoholysis, the OH number is 85, and a 50% by weight solution in glycol acetate-ethyl ether has a viscosity of 22 Pas (all the viscosities were measured by the falling-ball method).

EXAMPLE 4

A copolymerization corresponding to Example 3 is carried out at 50° C., but us a monomer mixture composed of 1,500 g of the Versatic ® vinyl ester defined above and 300 g of vinyl propionate. This gives a copolymer comprising 37.5 mol % of copolymerized units of tetrafluoroethylene, 44.5 mol % of copolymerized units of the Versatic ® vinyl ester, defined above, of component (a) and 18.0 mol % of copolymerized units of vinyl propionate. After alcoholysis, the copolymer has an OH number of 68.

The following surface-coating formulation for a white finish represents a typical example of surface-coating systems, such as can be formulated with the copolymers according to the invention:

| Blending in a bead mill | |
|---|---|
| Copolymer from Example 1 (50% in glycol acetate-ethyl ether) | 10.0 g |
| Glycol acetate-ethyl ether | 16.0 g |
| Titanium dioxide (RN 59 type) | 4.2 g |
| | 30.2 g |
| Surface-coating batch | |
| Bead mill batch as above | 30.2 g |
| Desmodur ® N (hexamethylene diisocyanate; 75% solution) | 2.2 g |
| Dibutyltin dilaurate (1% solution) | 25.0 mg |
| Characteristic data of the surface-coating: | |
| Surface-coating solids | about 33.5% |
| Binder:pigment | 1:0.63 |

We claim:
1. A crosslinkable fluorine-containing copolymer, comprising
   (a) 20 to 80 mol % of copolymerized units of a vinyl ester of the formula

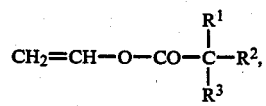

in which
   $R^1$, $R^2$ and $R^3$ are branched or straight-chain alkyl radicals or cycloakyl radicals and at most one of these radicals is hydrogen, the total acyl radical of the vinyl ester having at least 9 and at most 28 carbon atoms,
   (b) 5 to 50 mol % of copolymerized units of a vinyl ester of the formula

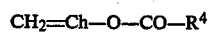

in which
   $R^4$ is a straight-chain alkyl radical having 1 to 3 carbon atoms, wherein 90 to 100% of the copolymerized units of said vinyl ester of component (b) are present in the OH form obtained by conversion of the ester groups of said copolymerized vinyl ester units of component (b) into OH groups by solvolysis subsequently to the copolymerization of components (a), (b) and (c), and
   (c) copolymerized units of a fluoroolefin in a quantity which makes the sum of the components a+b+c up to 100, but with the proviso that at least 10 mol % of copolymerized units of this fluoroolefin are present in the copolymer.

2. A crosslinkable fluorine-containing copolymer as claimed in claim 1, comprising
   (a) 20 to 60 mol % of copolymerized units of a vinyl ester of component (a) of claim 1,
   (b) 5 to 30 mol % of copolymerized units of a vinyl ester of component (b) of claim 1, 90 to 100% of the total number of copolymerized units of this vinyl ester of component (b) being present in the OH form obtained by solvolysis, and
   (c) copolymerized units of a fluoroolefin in a quantity which makes the sum of the components a+b+c up to 100, but with the proviso that at least 25 mol % of copolymerized units of this fluoroolefin are present in the copolymer.

3. A crosslinkable fluorine-containing copolymer as claimed in claim 1, wherein the vinyl ester of component (a) contains an acyl radical having 9 to 11 carbon atoms, at most one of the radicals $R^1$, $R^2$ and $R^3$ being hydrogen and at least one of these radicals being a methyl radical.

4. A crosslinkable fluorine-containing copolymer as claimed in claim 1, wherein the fluoroolefin of component (c) is tetrafluoroethylene.

* * * * *